United States Patent
Latorre et al.

(10) Patent No.: US 11,249,727 B2
(45) Date of Patent: Feb. 15, 2022

(54) EFFICIENT MATRIX DATA FORMAT APPLICABLE FOR ARTIFICIAL NEURAL NETWORK

(71) Applicant: Nvidia Corporation, Santa Clara, CA (US)

(72) Inventors: Jorge Albericio Latorre, Santa Clara, CA (US); Jeff Pool, Santa Clara, CA (US); David Garcia, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/073,512

(22) Filed: Oct. 19, 2020

(65) Prior Publication Data

US 2021/0034332 A1    Feb. 4, 2021

Related U.S. Application Data (63) Continuation of application No. 16/287,564, filed on Feb. 27, 2019, now Pat. No. 10,860,293.

(51) Int. Cl.

| | | |
|---|---|---|
| *G06F 7/78* | (2006.01) | |
| *G06F 7/57* | (2006.01) | |
| *G06N 3/04* | (2006.01) | |
| *G06F 16/901* | (2019.01) | |
| *G06F 17/16* | (2006.01) | |

(52) U.S. Cl.
CPC ............ *G06F 7/78* (2013.01); *G06F 7/57* (2013.01); *G06F 16/9017* (2019.01); *G06F 17/16* (2013.01); *G06N 3/04* (2013.01)

(58) Field of Classification Search
CPC .......... G06F 7/78; G06F 7/57; G06F 16/9017; G06F 17/16; G06F 2207/4824; G06N 3/04; G06N 3/063; G06N 3/082
See application file for complete search history.

(56) References Cited

U.S. PATENT DOCUMENTS

| | | | |
|---|---|---|---|
| 4,835,770 A | 5/1989 | Hayano | |
| 5,644,517 A | 7/1997 | Ho | |
| 6,573,846 B1 * | 6/2003 | Trivedi | G06F 9/3004 |
| | | | 341/67 |
| 10,452,744 B2 * | 10/2019 | Agrawal | G06F 7/00 |
| 2008/0126467 A1 | 5/2008 | Ghuloum | |

(Continued)

*Primary Examiner* — Farley Abad (57) ABSTRACT

Many computing systems process data organized in a matrix format. For example, artificial neural networks (ANNs) perform numerous computations on data organized into matrices using conventional matrix arithmetic operations. One such operation, which is commonly performed, is the transpose operation. Additionally, many such systems need to process many matrices and/or matrices that are large in size. For sparse matrices that hold few significant values and many values that can be ignored, transmitting and processing all the values in such matrices is wasteful. Thus, techniques are introduced for storing a sparse matrix in a compressed format that allows for a matrix transpose operation to be performed on the compressed matrix without having to first decompress the compressed matrix. By utilizing the introduced techniques, more matrix operations can be performed than conventional systems.

18 Claims, 5 Drawing Sheets

(56) References Cited

U.S. PATENT DOCUMENTS

| | | | |
|---|---|---|---|
| 2009/0282207 A1* | 11/2009 | Burkart | G06F 12/0615 711/170 |
| 2010/0027408 A1 | 2/2010 | Green et al. | |
| 2011/0307685 A1* | 12/2011 | Song | G06F 17/10 712/16 |
| 2015/0242484 A1* | 8/2015 | Zhao | G06F 16/22 707/755 |
| 2015/0324125 A1 | 11/2015 | Li et al. | |
| 2016/0203105 A1 | 7/2016 | Nakanishi | |
| 2016/0224473 A1* | 8/2016 | Acar | G06F 16/35 |
| 2019/0108436 A1 | 4/2019 | David et al. | |
| 2020/0272425 A1 | 8/2020 | Latorre et al. | |

* cited by examiner

| INDEX (355) | PATTERN SHAPE (360) | NON-ZERO INDICES (365) | TRANSPOSE INDICES (370) | ENTRIES TO REPLICATE FOR TRANSPOSE (375) |
|---|---|---|---|---|
| 0 | _ _ 1 2<br>_ _ 3 4<br>5 6 _ _<br>7 8 _ _ | (2,3),(2,3),(0,1),(0,1) | 2,2,2,1,0,2,0,0 | 6,0,0,3 |
| 1 | _ _ 1 2<br>_ 3 _ 4<br>5 _ 6 _<br>7 8 _ _ | (2,3),(1,3),(0,2),(0,1) | 2,2,2,1,0,2,0,0 | 3,0,0,6 |
| 2 | _ _ 1 2<br>_ 3 _ 4<br>5 6 _ _<br>7 _ 8 _ | (2,3),(1,3),(0,1),(0,2) | 2,2,2,1,0,1,0,0 | 3,6,0,0 |
| 3 | _ _ 1 2<br>_ 3 4 _<br>5 _ _ 6<br>7 _ _ 8 | (2,3),(1,2),(0,3),(0,1) | 2,2,2,1,0,2,0,1 | 3,0,0,4 |
| 4 | _ _ 1 2<br>_ 3 4 _<br>5 6 _ _<br>7 _ _ 8 | (2,3),(1,2),(0,1),(0,3) | 2,2,2,1,0,2,0,2 | 3,6,0,4 |
| 5 | _ _ 1 2<br>3 _ _ 4<br>_ 5 6 _<br>7 8 _ _ | (2,3),(0,3),(1,2),(0,1) | 1,2,2,1,0,2,0,0 | 5,0,0,6 |
| 6 | _ _ 1 2<br>3 _ _ 4<br>5 6 _ _<br>_ 7 8 _ | (2,3),(0,3),(0,1),(1,2) | 1,1,2,0,0,1,0,0 | 6,0,0,0 |

| NT 3 | NT 7 | NT 11 | NT 15 |
| NT 2 | NT 6 | NT 10 | NT 14 |
| NT 1 | NT 5 | NT 9 | NT 13 |
| NT 0 | NT 4 | NT 8 | NT 12 |

K=8, M=16, COMPRESSED 2:4 IN K

| T 3 | T 7 | T 11 | T 15 |
| T 2 | T 6 | T 10 | T 14 |
| T 1 | T 5 | T 9 | T 13 |
| T 0 | T 4 | T 8 | T 12 |

725

K=8, M=16, COMPRESSED 2:4 IN K

| T 15 | T 14 | T 13 | T 12 |
| T 11 | T 10 | T 9 | T 8 |
| T 7 | T 6 | T 5 | T 4 |
| T 3 | T 2 | T 1 | T 0 |

K=8, M=16, COMPRESSED 2:4 IN K

FIG. 7C

EFFICIENT MATRIX DATA FORMAT APPLICABLE FOR ARTIFICIAL NEURAL NETWORK

CROSS-REFERENCE TO RELATED APPLICATION

This application is a continuation application of U.S. patent application Ser. No. 16/287,564, filed by Latorre, et al. on Feb. 27, 2019, entitled "EFFICIENT MATRIX DATA FORMAT APPLICABLE FOR ARTIFICIAL NEURAL NETWORK," which is commonly assigned with present application and are incorporated herein by reference in its entirety.

TECHNICAL FIELD

This application is directed, in general, to artificial neural networks and, more specifically, to matrix operations in artificial neural networks.

BACKGROUND

Artificial neural networks (ANNs) are computing systems that are inspired by the biological neural networks. ANNs provide a framework for many different machine learning algorithms to work together and process complex data inputs. ANNs have been used on a variety of tasks, including computer vision, speech and image recognition, machine translation, social network filtering, playing board and video games and medical diagnosis.

SUMMARY

One aspect provides a method of transposing a compressed sparse matrix. The method includes representing the compressed sparse matrix as a plurality of compressed sparse submatrices in a logical space; and generating a compressed transpose of the compressed sparse matrix without decompressing the compressed sparse matrix. The compressed transpose is generated by transposing each of the compressed sparse submatrices based on a pattern of each of the compressed sparse submatrices in the logical space; and switching some of the compressed sparse submatrices based on locations of the some compressed sparse submatrices.

Another aspect provides a processor for transposing a compressed sparse matrix. The processor includes an arithmetic logic unit (ALU) configured to represent the compressed sparse matrix as a plurality of compressed sparse submatrices in a logical space and generate a compressed transpose of the compressed sparse matrix without decompressing the compressed sparse matrix. The ALU is configured to generate the compressed transpose of the compressed sparse matrix by transposing each of the compressed sparse submatrices based on a pattern of each of the compressed sparse submatrices in the logical space and switching some of the compressed sparse submatrices based on locations of the some compressed sparse submatrices.

BRIEF DESCRIPTION

Reference is now made to the following descriptions taken in conjunction with the accompanying drawings, in which.

DETAILED DESCRIPTION

An ANN is one or more computing system that mimics a human brain. Similar to neurons in a biological brain, an ANN is constructed of a collection of connected units or nodes that communicate with each other. In most of today's ANNs, the nodes are organized into layers of nodes, and each node of a layer is connected to several nodes in the layer beneath it and to several nodes in the layer above it. When a node in an ANN receives signal, it performs operations and "fires" the result along all of its outgoing connections, mimicking the brain.

ANNs "learn" to perform tasks by considering examples, generally without being programmed with any task-specific rules. This "learning" is also called training, and it involves passing data, e.g., weights, among the nodes. As ANNs are often used for data-intensive tasks such as computer vision and speech and image recognition, the complexity and amount of data ANNs deal with is great. As ANNs are generally represented as tensors, data involved often takes on the form of a matrix.

Introduced herein are techniques for efficiently performing operations on matrix-based data. Using the introduced techniques, operations such as compressing, decompressing and transposing matrix-based data can be realized using a smaller amount of data and processing power than the conventional methods.

Realizing a matrix can be compressed and processed more efficiently when some of its elements are set to zero, the introduced techniques apply, before compressing, a sparsity restriction that restricts the number of non-zero elements in a matrix. A matrix that has been applied with a sparsity restriction is called a "sparse" matrix herein. The introduced techniques compress a sparse matrix along the dimension the sparsity restriction is applied, getting rid of unnecessary, place-holding zero elements.

The introduced techniques change how metadata of a compressed sparse matrix has been considered. Unlike the conventional methods, which have considered indices of nonzero elements along the compression dimension as metadata of a compressed sparse matrix, the introduced techniques consider patterns of its non-zero elements in logical space (in uncompressed form) as a sparse matrix's metadata. This is based on a recognition that a sparse matrix of certain size, e.g., 4×4 matrix, can have only a limited number of patterns, i.e., locations of non-zeros elements. The introduced techniques use the pattern number as a compressed sparse matrix's metadata. As the data needed to represent each pattern is much smaller than the data needed to represent indices of non-zero elements along the compression dimension, the introduced techniques use a much smaller amount of data to store and access a matrix than the conventional methods.

Using pattern numbers of a matrix as an index, the introduced techniques store information about the matrix into a look up table (LUT). By looking up information such as the matrix's non-zero element indices and transpose from the LUT, the introduced concept can directly determine a transpose of a compressed matrix, without having to decompress and recompress before and after transposing as conventionally done.

The introduced techniques thus are not only simpler and faster than the conventional methods, but also are much more efficient because they do not need to store the decompressed data before transposing. Furthermore, as the information stored in the LUT is based on a manipulation of relatively small submatrices, the introduced techniques can use the LUT to transpose a bigger matrix that can be scaled using the submatrices in the LUT.

Figure 1A:
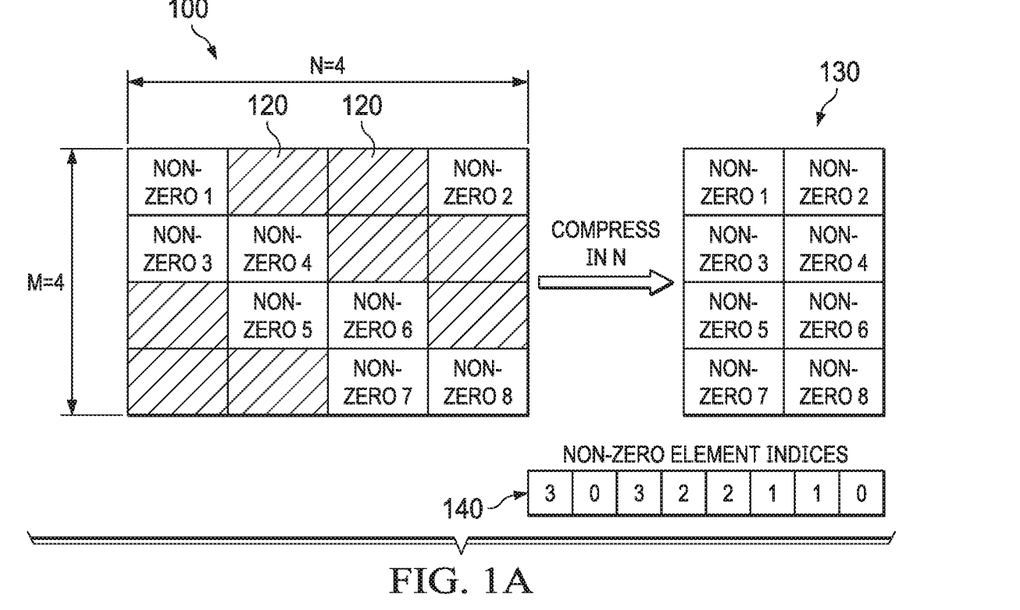
FIGS. 1A and B are diagrams of sparse matrices that are compressed and encoded according to the principles of the disclosure.

FIG. 1A illustrates diagrams of a sparse matrix 100 that is compressed and encoded according to the principles of the disclosure. In the illustrated embodiment, a sparse 4×4 matrix 100 that has been constrained under a 2 dimension, 2 element sparsity restriction is provided. "2 dimension" refers to a number of dimensions along which the sparsity constraint is imposed, e.g., along row N and column M, and "2 element" refers to a number of non-zero elements in each dimension along which the sparsity constraint is imposed. As a two element constraint is imposed on two dimensions, the matrix 100 has two non-zero elements per row and also per column. The hatched squares such as 120s refer to zero elements.

In the illustrated embodiment, the matrix 100 is compressed horizontally (along a row N) into two 2×4 compressed matrices 130. Taking into account the dimensions to which the matrix 100 is compressed along, indices of the non-zero elements in respective row 140 have been conventionally considered as metadata. Counting from right to left and then top to bottom with the right most column being zero, the index of the first non-zero element is 3, the second non-zero element is 0, the third non-zero element is 3, the fourth non-zero element is 2, the fifth non-zero element is 2, the sixth non-zero element is 1, the seventh non-zero element is 1, and the eighth non-zero element is 0. The indices are 16 bits long (2bit/element*2 element/row * 4 row/ matrix).

For an uncompressed matrix such as 100 that has been constrained under a 2 dimension, 2 element sparsity restriction, the number of possible non-zero element patterns/locations it can have is 90. Each of the patterns thus can be numbered and distinguished using only 7 bits of data. If a matrix such as 100 has been constrained under a 2 dimension 1 element sparsity restriction (4→1 non-zeros), the possible number of the patterns would be even smaller, resulting in only 24 possible patterns, which can be numbered using only 5 bits of data.

As such, instead of non-zero elements indices/locations 140, the introduced techniques can use a pattern number of a sparse matrix as metadata and significantly reduce the size of metadata storage area. Moreover, using each of these pattern numbers as an index for a LUT, the introduced techniques can store and look up useful information about a particularly restricted sparse matrix such as the matrix's non-zero elements indices/locations and compressed transpose information.

Figure 1B:
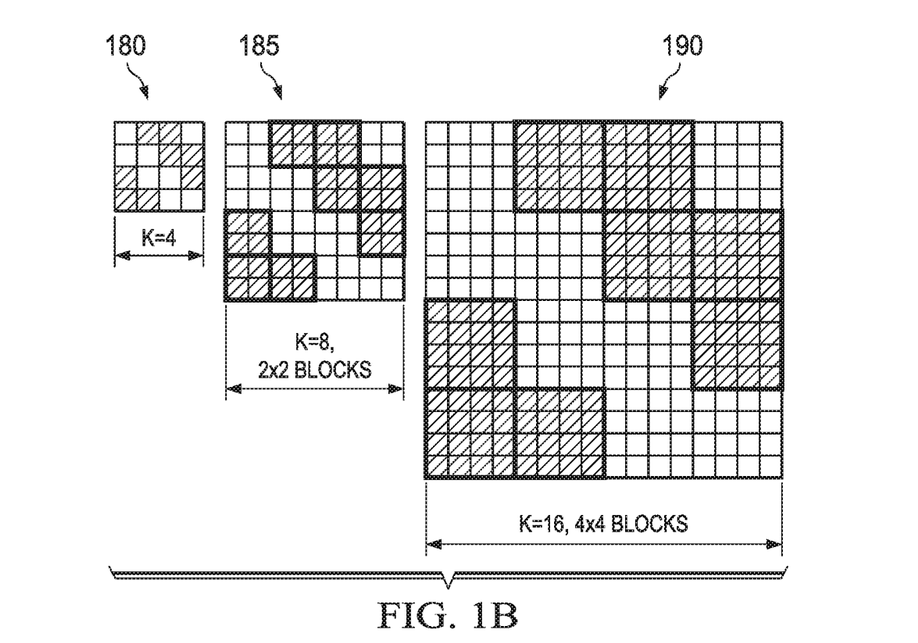

Similar to patterns of non-zero elements, patterns of non-zero element square blocks in a matrix under a sparsity restriction can also be used as metadata. FIG. 1B illustrates a 4×4 matrix 180, that is under a 2 dimension, 2 element sparsity restriction and hence has 90 possible patterns when 1×1 or individual non-zero element is considered as an element of the matrix 180. The number of possible patterns is also 90 for both an 8×8 matrix 185 and a 16x16 matrix under the same sparsity restriction when 2×2 and 4×4 non-zero element blocks are considered as an element, respectively. When using patterns of non-zero element square blocks in a matrix as metadata, the size of the blocks is stored, e.g., as a field in the LUT.

It is understood that using patterns of non-zero element square blocks as metadata is not limited to a matrix under a 2 dimension, 2 element sparsity restriction. Such patterns can also be used for a matrix under a different sparsity restriction, such as a 2 dimension 1 element sparsity restriction, that provides a reasonable number of possible patterns. It is also understood that non-zero element square blocks do not have be completely dense as long as the blocks are independently transposable.

Figure 2:
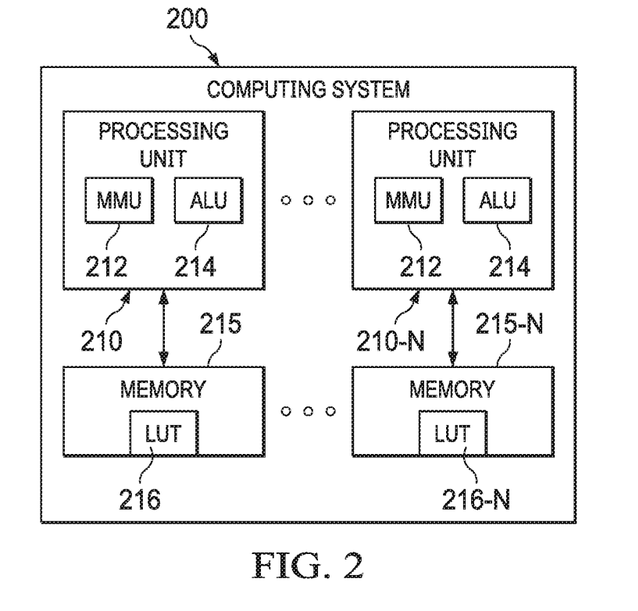
FIG. 2 is a block diagram of an embodiment of a computing system for performing operations on matrix-based data according to the principles of the disclosure.

FIG. 2 illustrates a block diagram of an embodiment of a computing system 200 performing operations on matrix-based data according to the principles of the disclosure. In the illustrated embodiment, the system 200 includes multiple processing units 210s and their respective memories 215s. The processing units 210-N are communicatively coupled to one another using conventional means.

Each of the processing units 210s includes an ALU that is configured to perform various operations, such as compression, decompression and transposition of a matrix, and a memory management unit (MMU) that is configured perform various logistic and ancillary operations that are related to the above operations, such as loading, moving, copying and saving. In the illustrated embodiment, each of the processing units 210s is a graphics processing unit. The processing units 210s can be a different type of general or special processing unit such as a central processing unit (CPU), filed-programmable gate array (FPGA), and application-specific integrated circuit (ASIC).

Each of the memories 215s stores data need to perform the matrix operations in a LUT 216. As mentioned above, information such as each matrix's non-zero element pattern number, locations/indices of the non-zero elements, compressed transpose information can be stored in the LUT 216. Each of the memories 215s may also store actual values of the matrices involved in the operations and a series of instructions that can cause the processing units 210s to perform the operations.

Figure 3A:
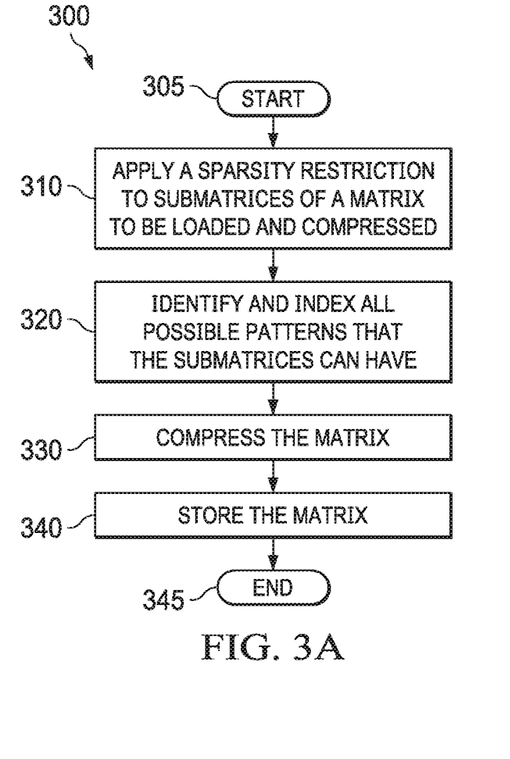
FIG. 3A is a flow diagram of an embodiment of a method for compressing a matrix according to the principles of the disclosure.

FIG. 3A illustrates a flow diagram of an embodiment of a method 300 for compressing a matrix according to the principles of the disclosure. The method 300 may be performed by an ALU, such as 214 in FIG. 2, of a processing unit. The method 300 starts at 305.

At step 310, a sparsity restriction is applied to a matrix to be compressed. At the step 310, the matrix is considered as a plurality of submatrices, and the sparsity restriction is applied to each submatrix. In one embodiment, each submatrix is a 4×4 matrix constrained under 2 dimension, 2 element sparsity restriction (2 non-zero elements to per row and column).

At step 320, all possible patterns that the submatrices can have are identified and indexed into a LUT. Each different pattern is assigned a number and serves as an index of the LUT for looking up related information about each pattern in the LUT.

Figure 3B:
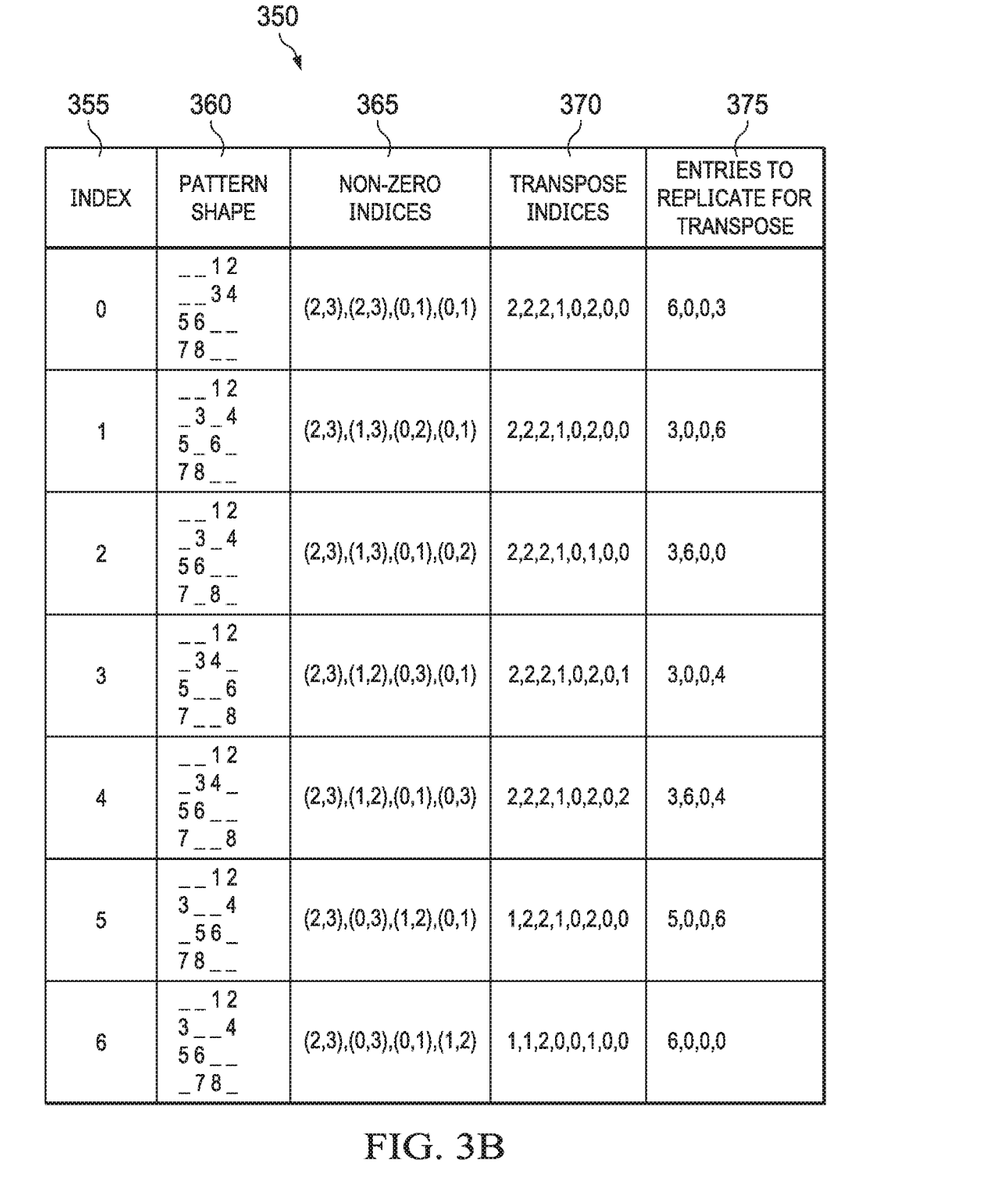
FIG. 3B is an embodiment of a look up table that is generated according to the principles of the disclosure.

Some example entries of a LUT 350 that is generated according to the principles of the disclosure are illustrated in FIG. 3B. The illustrated entries are the first six entries for a 4×4 submatrix constrained under a 2 dimension, 2 element sparsity restriction. For each of the six entries, the first column 355 includes index or pattern number, the second column 360 includes the pattern/matrix shape, the third column 365 includes information about non-zero elements, e.g., locations/indices of non-zero elements in the pattern ("regular metadata"), the fourth column 370 includes information about how to transform directly between the representations of compressed non-transpose and compressed transpose, e.g., source locations in the non-transposed compressed representation for each of the non-zero elements in the compressed transpose representation, and the fifth column 375 shows information about non-zero elements to replicate for compressed transpose, e.g., indices for non-zero elements to replicate. The LUT 350 may be located internally, within a memory of a processing unit that includes the ALU performing the method 300, such as 215 in FIG. 2, or externally of the processing unit. The information in the fifth column 375 is stored in the LUT 350, e.g., if the LUT 350 is used for encoding/compression, or elsewhere such as in a data structure of a processing unit that is performing the original compression, e.g., if the LUT 350 is only used for transposition/decompression.

At step 330, the matrix is compressed. The matrix is compressed by compressing its submatrices. The submatrices can be compressed along a direction the sparsity restriction is applied. For a submatrix with 2 direction sparsity, it can be compressed along any one of the direction, e.g., its row or column.

At step 340, the matrix including its element values and metadata is stored. Unlike the traditional method, which stores indices of all elements of a matrix as metadata ("regular metadata"), the step 240 stores the pattern numbers of the matrix's submatrices as metadata. As the pattern number for each submatrix can be as short as 7 bits, the storage space needed to store the matrix's metadata can be reduced significantly.

Both the matrix's element values and metadata can be stored in long-term storage medium co-located with the rest of data describing other matrices in an ANN, or in a main memory of a processing unit that would be using the matrix for an operation. They can also be stored into some other level of the processor's memory hierarchy closer to the processing elements. Matrix's element values and metadata can also be stored separately, in any of the aforementioned storages. For example, the matrix's element values may be stored in a long-term storage while its metadata and the related information data, e.g., the LUT may be stored in the memory of the processing unit. The method 300 ends at step 345.

Figure 4:
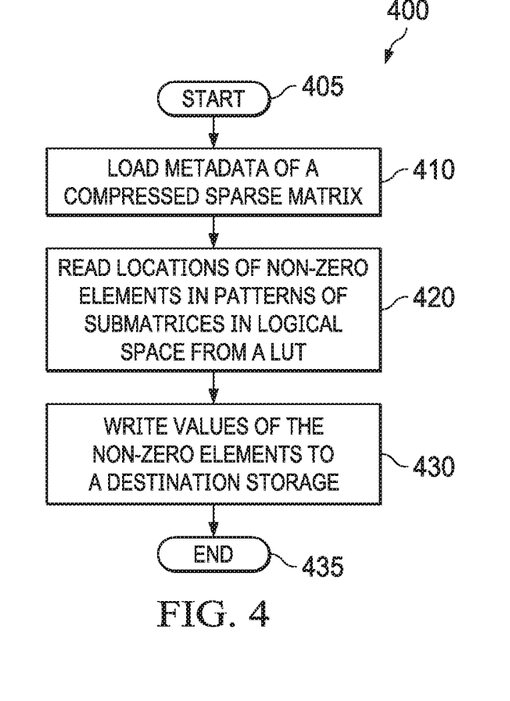
FIG. 4 is a flow diagram of an embodiment of a method for decompressing a sparse matrix according to the principles of the disclosure.

FIG. 4 illustrates a flow diagram of an embodiment of a method 400 for decompressing a sparse matrix according to the principles of the disclosure. The method 400 decompresses a compressed sparse matrix without decompressing it until it reaches a destination storage. The method 400 is used to decompress a compressed sparse matrix that has been constrained and compressed using a compression method such as 300, which utilizes pattern numbers of submatrices as indices of a LUT. The method 400 may be performed by an ALU of a processing unit, such as 214 in FIG. 2. The method 400 starts at 405.

At step 410, a compressed sparse matrix is loaded from a source storage onto an intermediate memory such as a register file of a processing unit and/or an intermediate cache level memory. The source storage may be a memory of the processing unit that performs the method 400. The compressed sparse matrix is loaded by loading metadata of its submatrices, such as 2×4 compressed matrices that is compressed from 4×4 matrices under a 2 dimension 2 element sparsity restriction. The metadata represent pattern numbers for non-zero element patterns of the compressed submatrices. For a compressed sparse matrix including multiple submatrices, the step 410 can be repeated multiple times.

At the step 420, using the loaded metadata as an index, locations of non-zero elements in the patterns of the compressed submatrices in logical space are read from the LUT. The step 420 may be carried out in parallel or simultaneously with the step 410.

At step 430, using the non-zero elements locations from the LUT, values of the non-zero elements are written to a destination storage. As these locations represent the locations of non-zero elements in logical space, they correspond to the locations of the non-zero elements in uncompressed/decompressed form. The destination storage may be a memory of another processing unit or another location of the same memory. It is understood that as the compressed matrix remains compressed until it reaches the destination storage, the method 400 can save significant intermediate storage space. The method 400 ends at a step 435.

Figure 5A:
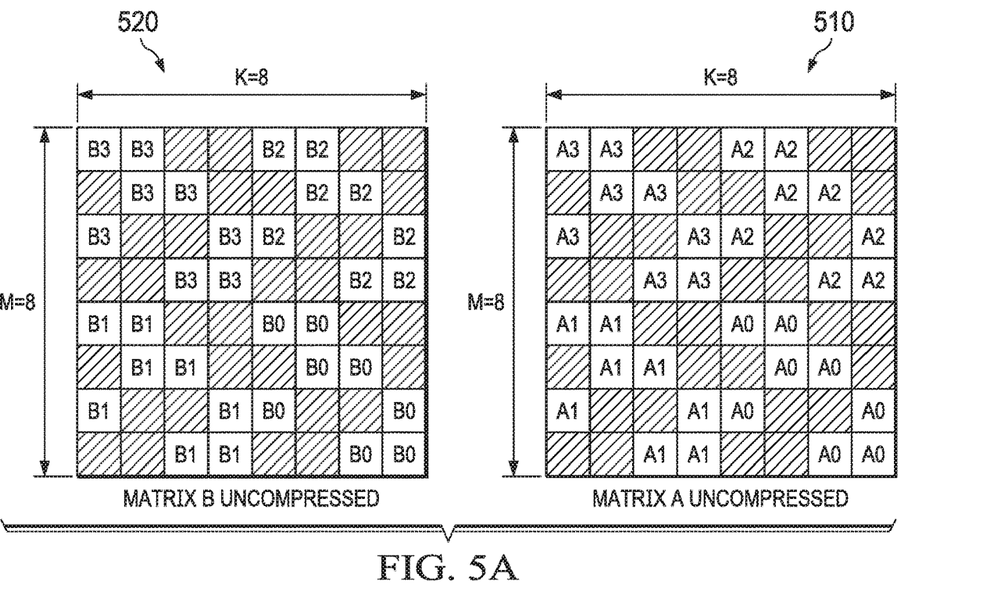
FIGS. 5A-B are diagrams of matrices that are being compressed and loaded according to the principles of the disclosure.
Figure 5B:
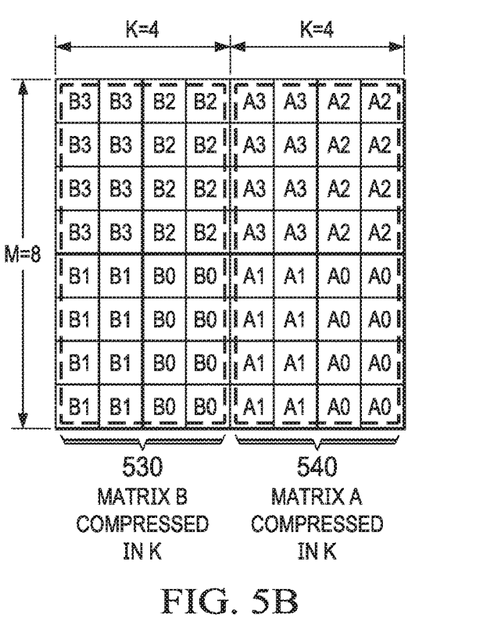

FIGS. 5A and B are diagrams of matrices 510, 520 that are being compressed and loaded according to the principles of the disclosure. FIG. 5A illustrates a logical (uncompressed) view of the matrices, and FIG. 5B illustrates a compressed view of the matrices before loading. In the illustrated embodiment, two 8×8 matrices are compressed into two 8×4 matrices, forming one 8×8 compressed matrix.

In FIG. 5A, two uncompressed 8×8 matrices, Matrix A 510 and Matrix B 520, are illustrated. In the illustrated view, both Matrix A 510 and Matrix B 520 are considered as being comprised of four 4×4 submatrices, submatrices A1-4 for Matrix A and submatrices B1-4 for Matrix B 520, each of which is imposed with 2 dimension, 2 non-zero element sparsity restriction. The white cells inside the matrices 510, 520 represent non-zero elements labeled with the respective submatrix numbers, and black cells represent zero elements. Although not illustrated, once the matrices are imposed with a sparsity restriction, all possible patterns that the submatrices can have are identified and indexed into a LUT. As discussed with FIG. 1, since each submatrix is 4×4 and under a 2 dimension, 2 non-zero element sparsity restriction, 90 possible patterns for the submatrices are identified and indexed into a LUT.

FIG. 5B shows Matrices A and B 510, 520 in their compressed forms 530, 540 are loaded. The Matrices A and B 510, 520 may be compressed using a compression method such as 300 in FIG. 3A. In the illustrated embodiment, the submatrices A1-4 and B1-4 of the Matrices A and B 510, 520 are compressed horizontally, along their rows. As each submatrix becomes a 2×4 compressed submatrix, the matrices 510, 520 have become two compressed 4×8 matrices 530, 540.

The compressed Matrices A and B 530, 540 are loaded using the pattern numbers of their submatrices. The submatrices can be loaded "row-first", which loads the submatrices by their physical positions, or "matrix-first", which loads in logical order. When loaded "row-first" the submatrices will be loaded in the order of A0, A1, B0, B1, A2, A3, B2, B3, and when loaded "matrix-first" in the order of A0, A1, A2, A3, B0, B1, B2, B3, B4. The matrices 530, 540 may be loaded using a load sparse matrix (LDSM) instruction (with optional transpose).

Figure 6:
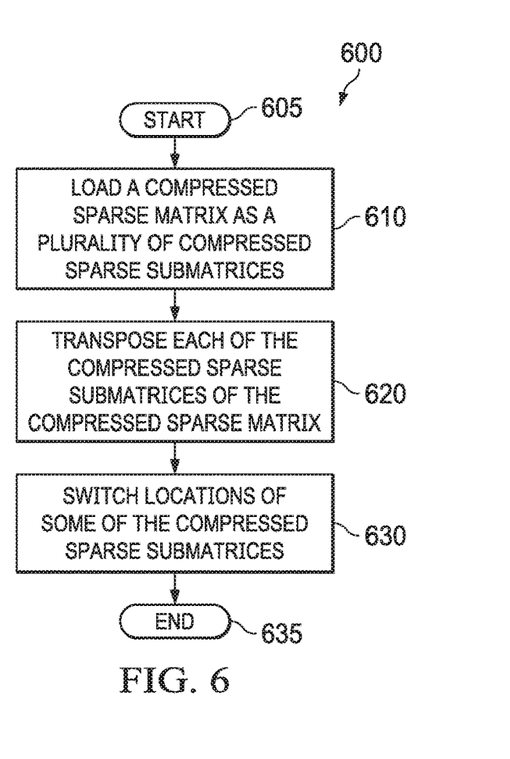
FIG. 6 is a flow diagram of an embodiment of a method for transposing a compressed matrix without decompressing according to the principles of the disclosure.

FIG. 6 illustrates a flow diagram of an embodiment of a method 600 for transposing a compressed matrix without decompressing according to the principles of the disclosure. The method 600 is used to transpose a matrix that has been compressed using a compression method such as 300 in FIG. 3A, which utilizes pattern numbers of the submatrices as metadata and an index for a LUT. The method 600 may be performed by an ALU of a processing unit, such as 214 in FIG. 2. The method 600 starts at step 605.

At step 610, a compressed matrix to be transposed is loaded in a logical space. In the illustrated embodiment, the compressed matrix consists of a plurality of submatrices, and each submatrix is represented in the logical space. It is understood that for the method 600 to work the compressed matrix has to be a rectangular matrix with dimensions that are multiples of the submatrix dimensions in logical space/uncompressed form.

Once loaded, each compressed submatrix of the compressed matrix is transposed at step 620. Each of the compressed submatrices is transposed based on a non-zero element pattern of each compressed submatrices in logical space. Using the respective pattern as an index, transpose information for each compressed submatrix, e.g., 370 and 375 in FIG. 3B, can be obtained from a LUT. The LUT is a look up table that has been created when the submatrices are compressed based on the dimension and the sparsity restriction. It is understood that when the compressed matrix consists of only 1 submatrix, e.g., when the compressed matrix has same size/dimension as the compressed submatrix, the method 600 may end once the step 620 is performed.

The transposition of submatrices using data stored in a LUT can be implemented in a multitude of ways in software or hardware. One hardware implementation relies on multiplexers to choose a proper value from a non-transpose of a compressed submatrix for each non-zero element in a transpose of the compressed submatrix. A non-transpose, compressed representation of a 4×4 submatrix with two-dimensional two-element sparsity looks like Table 1:

TABLE 1

| A | B |
| C | D |
| E | F |
| G | H |

For a compressed submatrix such as one in Table 1, there are only a limited number of ways its transpose can look. In particular, a value for each non-zero element in the transpose of the compressed submatrix can only come from a subset of the non-zero elements in the non-transpose of the compressed submatrix:

TABLE 2

| A, C, E | C, E, G |
| A, B, C, D, E, F | C, D, E, F, G, H |
| A, B, C, D, E, F, | C, D, E, F, G, H |
| B, D, F | D, F, H |

As shown above, four locations in the transpose of the compressed submatrix can only be populated by values from one of three non-zero elements, e.g., ACE, CEG, BDF and DFH, and the other four locations could be populated by values from one of six non-zero elements, e.g., ABCDEF, CDEFGH, ABCDEF, CDEFGH. The transposition thus can be implemented using four 3:1 multiplexers and four 6:1 multiplexers.

A modification to this implementation can be made by replicating values of some non-zero elements of the non-transposed compressed submatrix and adding them as extra non-zero elements to the non-transposed compressed submatrix. Each replicated value would correspond to a value from CDEF, which are common to the four middle locations requiring 6:1 multiplexers. The modification would allow the four 6:1 multiplexers to be swapped for four 3:1 multiplexers and simplify the implementation in hardware/software.

For example, index 4 of the LUT in FIG. 3B provides:

TABLE 3

| 4 | _ _ 1 2 | (2, 3), (1, 2), | 2, 2, 2, 1, | 3, 6, 0, 4 |
|   | _ 3 4 _ | (0, 1), (0, 3) | 0, 2, 0, 2 |   |
|   | 5 6 _ _ |   |   |   |
|   | 7 _ _ 8 |   |   |   |

Using the transpose information in the fourth and fifth column, e.g., 370 and 375 in FIG. 3B, of Table 3, a submatrix having a matrix shape of the second column can be directly transformed into a transposed compressed representation using four 3:1 multiplexers. The fourth and fifth columns of Table 3 allow values for all non-zero elements to come from one of three positions by replicating values of CDEF (which are common to all of the "middle" entries). Using the simplified multiplexing, the non-transposed compressed representation of the submatrix would look:

TABLE 4

| 1 | 2 |
| 3 | 4 |
| 5 | 6 |
| 7 | 8 |
| 3 | 6 |
| 0/X | 4 |

Table 4 shows the non-transposed compressed representation with four extra replicated entries at the end, which are populated with values corresponding to the indices in the fifth column (3, 6, X (don't care, empty, 0), and 4). When the value of these extra replicated entries are stored with the data of the non-transposed compressed submatrix as shown above, the information in the fifth column (although conceptually belong to the submatrix in the index) may be omitted from the LUT. While the indices of these replicated values may still be stored in a LUT or other data structure as described above (with respect to FIG. 3B), the replicated values themselves are stored with the data of the compressed submatrix.

To provide a compressed transpose of the submatrix, the values in the non-transposed compressed representation must be moved around. The fourth column indicates where to find the value for each entry. Table 5, which is a new version of Table 2, has these "extra entries" made explicit, each position only has three possible sources:

TABLE 5

| A, C, E | C, E, G |
| A, B, 3 | G, H, 6 |

TABLE 5-continued

| | |
|---|---|
| A, B, 0 | G, H, 4 |
| B, D, F | D, F, H |

The positions are chosen based on the contents of the fourth column, where 0, 1, 2 indicating the first, second and third source, respectively. As such, the underlined elements corresponding to the source location in the fourth column of Table 3 are selected:

TABLE 6

| | |
|---|---|
| A, C, $\underline{E}$ | C, E, $\underline{G}$ |
| A, B, $\underline{3}$ | G, H, $\underline{6}$ |
| $\underline{A}$, B, 0 | G, H, $\underline{4}$ |
| $\underline{B}$, D, F | D, F, $\underline{H}$ |

When properly selected, the submatrix would look (with the letters above replaced with their corresponding numerals from the compressed representation):

TABLE 7

| | |
|---|---|
| 5 | 7 |
| 3 | 6 |
| 1 | 4 |
| 2 | 8 |

This matches the compressed transpose representation of the submatrix in the index 4 that may be obtainable from going through conventional three stage (decompression+transposition+re-compression) process. Instead of those three stages, the compressed transpose representation can be directly generated from one access to the LUT and original compressed representation. Slightly increasing the data size of the compressed submatrix has made the transpose operation much simpler. It is understood that the modification to the transposition operation is not limited to the above example, and there may be other modifications that are based on the similar data size/simplicity tradeoff.

Once the submatrices are transposed, the compressed matrix as a whole is transposed by switching locations of some of the submatrices at step 630. Locations of some of the submatrices are switched as if they have been flipped over a main diagonal that extends from the top left corner to the bottom right corner of the compressed matrix. A similar method may be employed for rectangular matrices, in which the diagonal is that of a square matrix with dimensions of the larger side of the rectangular matrix. The method 600 ends at step 635.

Figure 7A:
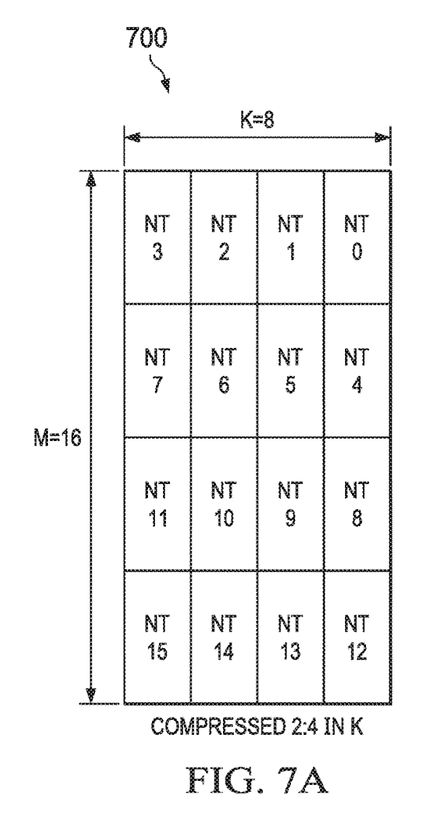
FIGS. 7A-C are diagrams of a compressed matrix that is being loaded with transposition according to the principles of the disclosure.
Figure 7B:
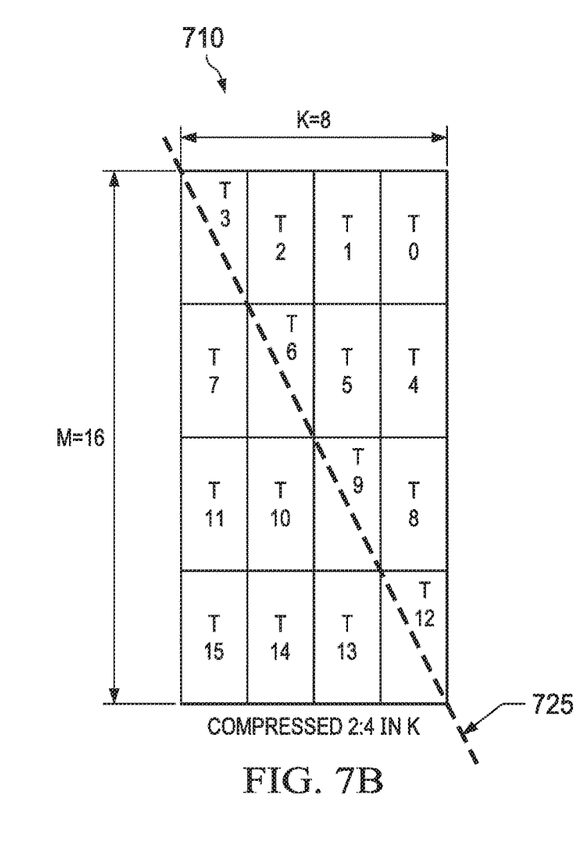
Figure 7C:
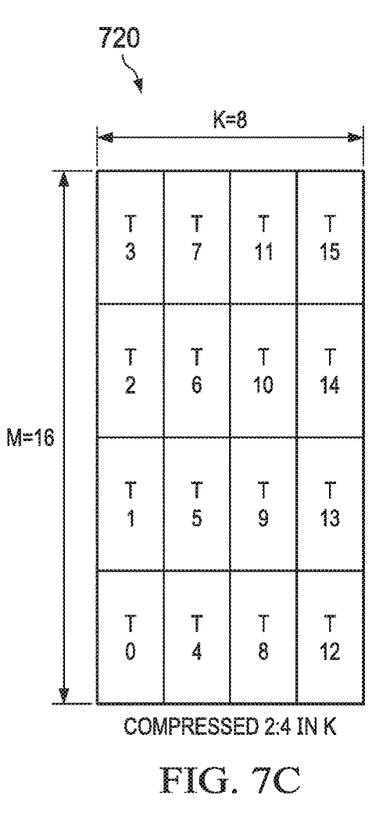

FIGS. 7A-C illustrate are diagrams of a compressed matrix that is being loaded with transposition according to the principles of the disclosure. The compressed matrix may be transposed using a transposition method such as 600 in FIG. 6. FIG. 7A shows a compressed, non-transposed matrix 700 to be transposed. As compressed, the matrix 700 is an 8×16 matrix, consisting of 16 4×4 submatrices $NT_{0-15}$ that have been imposed with 2 non-zero element, 2 direction sparsity and compressed along the row. NT indicates that each submatrix is in non-transposed form.

FIGS. 7B and C show how the compressed non-transposed matrix 700 is directly loaded on to a destination storage with transposition without going through a decompression. In FIG. 7B, each of the non-transposed submatrices $NT_{0-15}$ is transposed into a transposed submatrix $T_{0-15}$ is, respectively, forming a partially transposed matrix 710. As mentioned above with the step 620, the non-transposed submatrices $NT_{0-15}$ are transposed using the transpose information from a LUT. Using respective pattern of each submatrix in logical space as index, the transpose information is looked up. Once all the non-transposed submatrices $NT_{0-15}$ are transposed, locations of some of the transposed submatrices $T_{0-15}$ is are switched. Locations of the transposed submatrices $T_{1, 2, 4, 5, 7, 8, 10, 11, 13, 14, 15, 16}$ are switched as if they have been flipped over a main diagonal 725 that extends from the top left corner to the bottom right corner of the compressed matrix 710.

As shown in FIG. 7C, locations of the transposed submatrices $T_5$ and $T_{10}$ are switched, locations of the transposed submatrices $T_4$ and $T_{14}$ are switched, locations of the transposed submatrices $T_1$ and $T_{11}$ are switched, locations of the transposed submatrices To and $T_{15}$ are switched, locations of the transposed submatrices $T_2$ and $T_7$ are switched and locations of the transposed submatrices $T_8$ and $T_{13}$ are switched. Locations of the transposed submatrices $T_{3, 6, 9, 12}$ that the diagonal extend across are not switched since they are merely flipped over themselves. Once some of the transposed submatrices are switched, the partially transposed compressed matrix 710 has become a fully transposed compressed matrix 720. It is understood that a fully transposed compressed matrix such as 720 may be generated and loaded/moved using an instruction such as LDSM.T or MOVM.T. It is also understood that based on the capabilities of the instructions, the transposition may be carried out using multiple instructions, such as two separate instructions with each transposing and loading/moving a half (8×8) of the 8×16 matrix at a time.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method for transposing a matrix, comprising:
   accessing by a processor a first index for a compressed version of a first matrix, wherein the compressed version of the first matrix includes an array of values, wherein the values of the array are values in an uncompressed version of the first matrix, wherein a number of the values in the array is less than a number of the values in the uncompressed version of the first matrix, wherein each of the values in the array has a corresponding position in the array, wherein each of the values in the uncompressed version of the first matrix has a corresponding location in the first matrix, wherein the first index is an entry into a lookup table that indicates a mapping between the positions in the array and the locations in the uncompressed version of the first matrix; and
   determining by the processor, based on the first index, which one of the positions in the array of the compressed version of the first matrix correlates to a first location in an uncompressed version of a second matrix, wherein the second matrix is a transpose of the first matrix, wherein the processor includes an arithmetic logic unit (ALU).

2. The method of claim 1, wherein said determining comprises:
   identifying a predetermined subset of the positions in the array that correlates to the first location.

3. The method of claim 2, wherein said determining comprises:
   accessing a second index based on the first index; and
   determining, based on the second index, which one of the predetermined subset of the positions correlates to the first location.

4. The method of claim 2, wherein said determining comprises:
   accessing a second index based on the first index;
   determining, based on the second index, that the first location correlates to a position in a subset of the predetermined subset of the positions; and
   identifying the position that correlates to the first location based on the first index and the determination that the first location correlates to the position in the subset of the predetermined subset of the positions.

5. A method for transposing a matrix, comprising:
   accessing by a processor a set of indices, wherein each index in the set of indices corresponds to one of a plurality of compressed versions of submatrices of a first matrix;
   accessing by the processor a first index in the set of indices, wherein the first index corresponds to a compressed version of a first submatrix of the first matrix, wherein the compressed version of the first submatrix includes an array of values, wherein the values of the array are values in an uncompressed version of the first submatrix, wherein a number of the values in the array is less than a number of the values in the uncompressed version of the first submatrix, wherein each of the values in the array has a corresponding position in the array, wherein each of the values in the uncompressed version of the first submatrix has a corresponding location in the first submatrix, wherein the first index is an entry into a lookup table that indicates a mapping between the positions in the array and the locations in the uncompressed version of the first submatrix;
   determining by the processor, based on the set of indices, that the first index correlates to a second submatrix of a second matrix, wherein the second matrix is a transpose of the first matrix; and
   determining by the processor, based on the first index, which one of the positions in the array of the compressed version of the first submatrix correlates to a first location in an uncompressed version of the second submatrix, wherein the second submatrix is a transpose of the first submatrix wherein the processor includes an arithmetic logic unit (ALU).

6. The method of claim 5, wherein said determining which one of the positions comprises:
   identifying a predetermined subset of the positions in the array that correlates to the first location.

7. The method of claim 6, wherein said determining which one of the positions comprises:
   accessing a second index based on the first index; and
   determining, based on the second index, which one of the predetermined subset of the positions correlates to the first location.

8. The method of claim 6, wherein said determining which one of the positions comprises:
   accessing a second index based on the first index;
   determining, based on the second index, that the first location correlates to a position in a subset of the predetermined subset of the positions; and
   identifying the position that correlates to the first location based on the first index and the determination that the first location correlates to the position in the subset of the predetermined subset of the positions.

9. A processor configured to perform operations comprising:
   accessing by the processor a first index for a compressed version of a first matrix, wherein the compressed version of the first matrix includes an array of values, wherein the values of the array are values in an uncompressed version of the first matrix, wherein a number of the values in the array is less than a number of the values in the uncompressed version of the first matrix, wherein each of the values in the array has a corresponding position in the array, wherein each of the values in the uncompressed version of the first matrix has a corresponding location in the first matrix, wherein the first index is an entry into a lookup table that indicates a mapping between the positions in the array and the locations in the uncompressed version of the first matrix; and
   determining by the processor, based on the first index, which one of the positions in the array of the compressed version of the first matrix correlates to a first location in an uncompressed version of a second matrix, wherein the second matrix is a transpose of the first matrix, wherein the processor includes an arithmetic logic unit (ALU).

10. The processor of claim 9, wherein said determining comprises:
identifying a predetermined subset of the positions in the array that correlates to the first location.

11. The processor of claim 10, wherein said determining comprises:
accessing a second index based on the first index; and
determining, based on the second index, which one of the predetermined subset of the positions correlates to the first location.

12. The processor of claim 10, wherein said determining comprises:
accessing a second index based on the first index;
determining, based on the second index, that the first location correlates to a position in a subset of the predetermined subset of the positions; and
identifying the position that correlates to the first location based on the first index and the determination that the first location correlates to the position in the subset of the predetermined subset of the positions.

13. The processor of claim 10, wherein the processor includes a memory configured to store the lookup table.

14. A processor configured to perform operations comprising:
accessing by the processor a set of indices, wherein each index in the set of indices corresponds to one of a plurality of compressed versions of submatrices of a first matrix;
accessing by the processor a first index in the set of indices, wherein the first index corresponds to a compressed version of a first submatrix of the first matrix, wherein the compressed version of the first submatrix includes an array of values, wherein the values of the array are values in an uncompressed version of the first submatrix, wherein a number of the values in the array is less than a number of the values in the uncompressed version of the first submatrix, wherein each of the values in the array has a corresponding position in the array, wherein each of the values in the uncompressed version of the first submatrix has a corresponding location in the first submatrix, wherein the first index is an entry into a lookup table that indicates a mapping between the positions in the array and the locations in the uncompressed version of the first submatrix;
determining by the processor, based on the set of indices, that the first index correlates to a second submatrix of a second matrix, wherein the second matrix is a transpose of the first matrix; and
determining by the processor, based on the first index, which one of the positions in the array of the compressed version of the first submatrix correlates to a first location in an uncompressed version of the second submatrix, wherein the second submatrix is a transpose of the first submatrix wherein the processor includes an arithmetic logic unit (ALU).

15. The processor of claim 14, wherein said determining which one of the positions comprises:
identifying a predetermined subset of the positions in the array that correlates to the first location.

16. The processor of claim 15, wherein said determining which one of the positions comprises:
accessing a second index based on the first index; and
determining, based on the second index, which one of the predetermined subset of the positions correlates to the first location.

17. The processor of claim 15, wherein said determining which one of the positions comprises:
accessing a second index based on the first index;
determining, based on the second index, that the first location correlates to a position in a subset of the predetermined subset of the positions; and
identifying the position that correlates to the first location based on the first index and the determination that the first location correlates to the position in the subset of the predetermined subset of the positions.

18. The processor of claim 15, wherein the processor includes a memory configured to store the lookup table.

* * * * *